United States Patent
Herington

(10) Patent No.: US 7,903,571 B1
(45) Date of Patent: Mar. 8, 2011

(54) SYSTEM AND METHOD FOR IMPROVING MULTI-NODE PROCESSING

(75) Inventor: Daniel Edward Herington, Dallas, TX (US)

(73) Assignee: Hewlett-Packard Develpment Company, L.P., Houston, TX (US)

( * ) Notice: Subject to any disclaimer, the term of this patent is extended or adjusted under 35 U.S.C. 154(b) by 1404 days.

(21) Appl. No.: 10/887,731

(22) Filed: Jul. 9, 2004

(51) Int. Cl.
*H04J 1/16* (2006.01)

(52) U.S. Cl. ............... 370/252; 370/468; 709/224

(58) Field of Classification Search ............ 370/230, 370/229, 230.1, 241–247, 252, 253, 468; 709/223–226, 229
See application file for complete search history.

(56) References Cited

U.S. PATENT DOCUMENTS

| | | | |
|---|---|---|---|
| 6,055,571 A * | 4/2000 | Fulp et al. | 709/224 |
| 6,092,178 A * | 7/2000 | Jindal et al. | 712/27 |
| 6,542,511 B1 * | 4/2003 | Livermore et al. | 370/406 |
| 6,640,238 B1 * | 10/2003 | Bowman-Amuah | 709/201 |
| 6,667,956 B2 * | 12/2003 | Beshai et al. | 370/238 |
| 7,039,577 B1 * | 5/2006 | Fingerhut et al. | 703/21 |
| 7,209,434 B2 * | 4/2007 | Kano et al. | 370/216 |
| 7,324,637 B2 * | 1/2008 | Brown et al. | 379/207.02 |
| 2003/0093528 A1 * | 5/2003 | Rolia | 709/226 |
| 2003/0128702 A1 * | 7/2003 | Satoh et al. | 370/390 |
| 2004/0106417 A1 * | 6/2004 | Schieder et al. | 455/466 |
| 2004/0190444 A1 * | 9/2004 | Trudel et al. | 370/224 |
| 2004/0213155 A1 * | 10/2004 | Xu et al. | 370/232 |
| 2005/0193115 A1 * | 9/2005 | Chellis et al. | 709/226 |
| 2005/0286434 A1 * | 12/2005 | McKee et al. | 370/252 |
| 2007/0118630 A1 * | 5/2007 | Hashimoto et al. | 709/223 |

* cited by examiner

*Primary Examiner* — Ricky Ngo
*Assistant Examiner* — Kan Yuen

(57) ABSTRACT

In one embodiment there is shown a method for improving multi-node processing, the method operable in a system having multi-node resources distributed across a network at various network nodes. The method of the embodiment comprises measuring application workload response time at each node in the system; communicating the measured application workload response time from each node where measurements are taken to a central point in the system; and from the central point, adjusting the resources available at each node so as to optimize the overall response time and throughput of work processed by the system.

27 Claims, 3 Drawing Sheets

SYSTEM AND METHOD FOR IMPROVING MULTI-NODE PROCESSING

FIELD OF THE INVENTION

The following description relates to workload balancing and more specifically to systems and methods for improving multi-node application processing.

DESCRIPTION OF RELATED ART

In many situations it is required that a computing task, or set of tasks is performed at different nodes of a distributed network. In an attempt to manage the response time of a computing task it is important to be able to add (or possibly subtract) resources at a point where bottlenecks exist. Simply identifying the response times at various nodes in the network and adding resources at a "slow" or bottleneck node, can, under some situations, actually increase the overall response time.

BRIEF SUMMARY OF THE INVENTION

In one embodiment there is shown a method for improving multi-node processing, the method operable in a system having multi-node resources distributed across a network at various network nodes. The method of the embodiment comprises measuring application workload response time at each node in the system; communicating the measured application workload response time from each node where measurements are taken to a central point in the system; and from the central point, adjusting the resources available at each node so as to optimize the overall response time and throughput of work processed by the system.

In a further embodiment there is shown a multi-node processing system comprising a plurality of resources running at different nodes; a network interconnecting the nodes; a resource manager for each node; a data gathering point common to the nodes; and a communication link between each resource manager and the data gathering point such that the data gathering point can monitor response time for each node, thereby controlling resources at any node found to be a bottleneck node.

DETAILED DESCRIPTION

Figure 1:
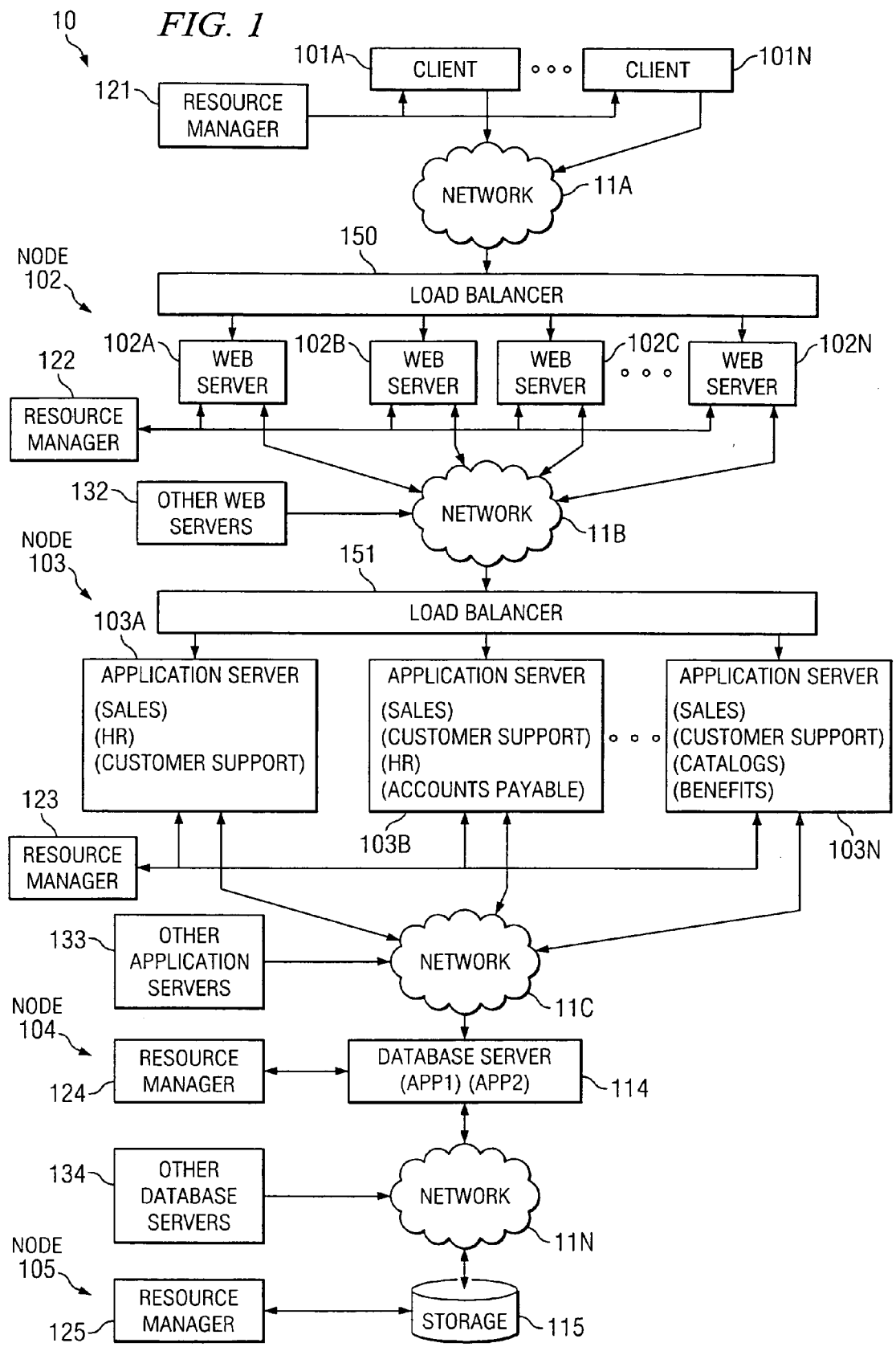
FIG. 1 shows one embodiment of a multi-node distributed processing system.

FIG. 1 shows one embodiment of multi-node distributed processing system 10 where different nodes in a computer system, such as nodes 102-105, are interconnected by a communication network, such as network 11A-11N. Network 11A-11N could be portions of a single network, or different networks and can be wireline, wireless or a combination thereof. At node 102, there are several instances, 102A-102N, of web servers that handle various clients 101A-101N. Each web server can handle a number of clients, each directed to one of a number of applications located on an application server 103A-103N. At node 103, there is shown three applications, (Sales, HR and Customer Support) each having multiple instances (sets) of the application handled by that particular server. These three applications are representative examples only and any number and/or types of applications can be substituted therefore. Each application set (103A, 103B, 103N) can have different application types and applications that are likely to cause system slow down should be positioned in more than one set. Likewise, the concepts discussed herein could be used with any number of tiers as well.

In operation, a first client 101A that desires certain data pertaining to sales sends a message to the system. In such a situation, client 101A is connected through network 11A to node 102 and is directed to web server 102B by load balancer 150. Web server 102B, in turn, sends a message via network 11B to load balancer 151 to select an available (sales) application. Load balancer 151, in turn, selects a (sales) application in system (tier) 103B at node 103. The sales application then is connected, if desired, to database server 114 (app 1) at node 104 via network 11C so as to obtain information from storage 115 via network 11N at node 105.

This system operation goes on for each request from a client 101A-101N. Over a period of time, the workloads on the various instances of an application could get out of balance, thereby affecting the overall response time and throughput of the system. In this context, response time is defined as the time it takes an instruction from a client to be completed and the results returned to the client. One example of the problem (at the application node) would be when seven clients require access to application server (sales) 103A. Assuming there are only six instances of sales applications, for example, the time for response at node 103 would go up and could possibly exceed the expected or desired response time of the system. Note that many other scenarios could arise at any of the nodes that could result in a higher than desired response time. For example, a web server (or portion thereof) could go down, or storage 115 could become slow to respond.

At each node it is possible to measure the response time from each application instance at each tier. This makes it possible to ensure that the response time of the node application is consistent between different instances of each clustered workload as is further consistent with the response time expected for the particular task. It is also possible, under control of resource managers 121-125 to determine the overall response time of the entire system, as will be discussed hereinafter. Each node can have, if desired, access to other applications, such as shown at servers 132, 133, and 134.

Figure 2:
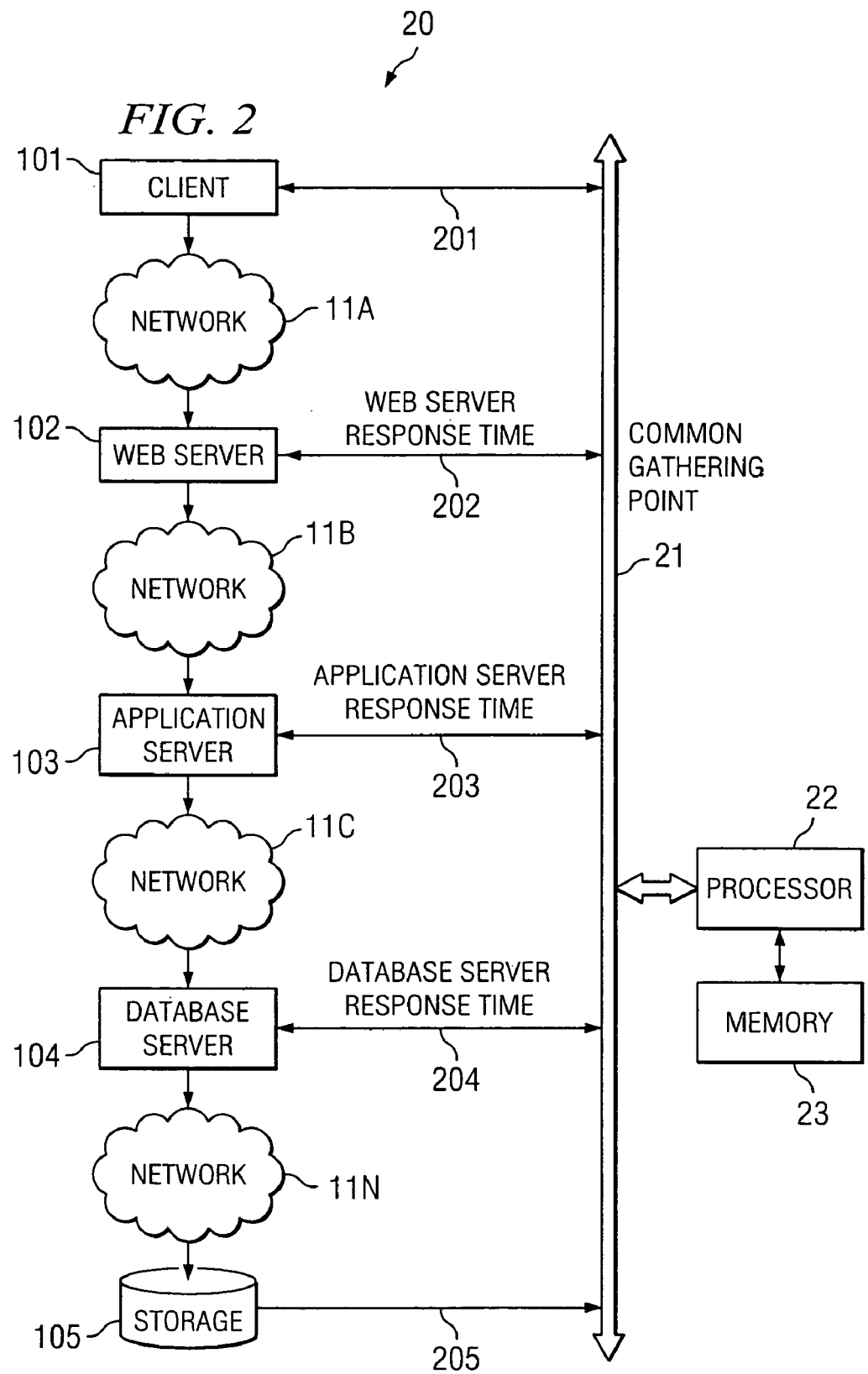
FIG. 2 shows one embodiment of a system for collecting data from the nodes of the processing system of FIG. 1.

FIG. 2 shows an example of system 20 in which the response time measured from the various applications at each node in the network path being communicated over links 201-205 to common gathering point 21. These communication links can be wireline or wireless and can be part of network 11A-11N, or can be separate therefrom. Note that common gathering point 21 can be physically separated from the nodes or can be, if desired, part of a node. By collecting the response time from each node (102-105, FIG. 1), or from those nodes known to be potential problem nodes, at common gathering point 21, for example, under control of processor 22 and memory 23, the node causing a delay (bottleneck) in the end-to-end response time can be determined. In one embodiment, the code for controlling the operations discussed herein could reside on media running at processor 22. It should be appreciated that system 20 includes computer usable storage medium for at least partially controlling the operation of a computer (e.g., nodes 101-105). Examples of computer usable storage medium include, among other things, one or more electronic storage devices associated with computer systems, such as a database server 104, an application server 103, a web server 102 and so on, where the one or more electronic storage devices would have instructions stored thereon for various embodiments described herein. Other examples of computer usable storage medium include, among other things, a compact disk (CD) with instructions stored thereon that can be installed on one or more electronic storage devices associated with a database server 104, an application server 103, or a web server 102.

When a bottleneck is determined, gathering point 21 issues directives to the workload management tools located at the node determined to be responding slower than anticipated (target node) instructing the target node to allocate more resources to the component that is experiencing performance degradation. These other resources can come from other applications that are on the node, for example, in a different tier. The system also has the ability to activate temporary capacity for this purpose. In this case, it would be possible for each node to have only one workload (application) as long as there was temporary capacity that could be applied if needed. Also, in some situations it might be possible to increase (perhaps temporarily) the speed of an application.

A counter-productive scenario could occur if each node were allowed to only analyze itself without regard to what is going on at other nodes. For example, the problem could occur if the measure of response time at the application server was slow, but the real reason was that the database was having problems. If the system added resources to the application server, it is possible that the result would be to just send more work to the database which would slow down even more.

Figure 3:
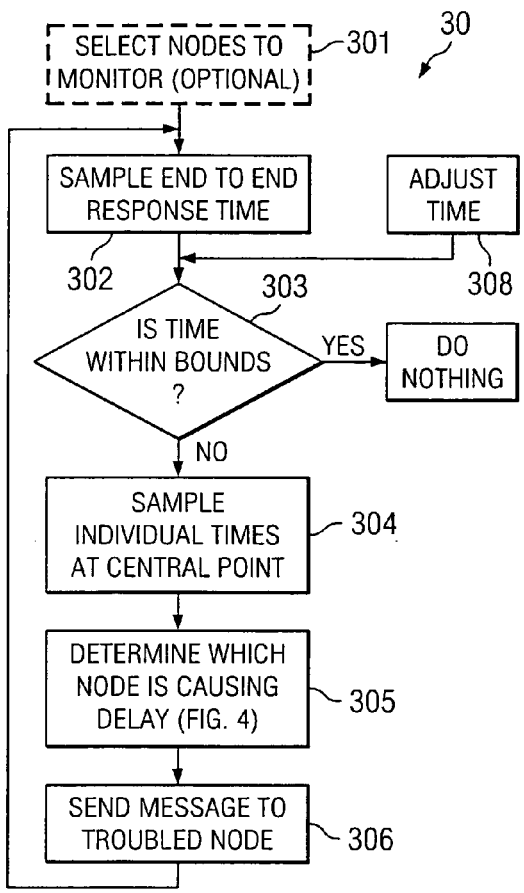
FIG. 3 shows one embodiment of a flow chart for controlling workload balancing among nodes of a multi-node processing system.

FIG. 3 shows an operational flow diagram 30 for one embodiment where process 301 selects which nodes to monitor (this process is optional in this example), and process 302 samples end-to-end response time from, for example, client 101 to storage 105 (in the example shown in FIG. 1). Note that any number of nodes could be monitored and that a sub-set of all nodes could be monitored. Also, note that the number of nodes monitored can be changed (for example, by the system administrator, or otherwise) from time to time, if desired.

Process 303 (which could be optional) determines whether the response time for the selected nodes is within the anticipated time bounds. This time can be a fixed time, a statistically determined time or a variable time, as desired. Optional process 308 adjusts the acceptable time depending on the number and type of nodes and/or other factors. The acceptable response times can be set differently for each tier, if desired.

When process 303 determines that the response time is unacceptable, process 304 reads the individual node process times and process 305 (for example, by the process shown in FIG. 4) determines which node (the target node) is causing the throughput delay, i.e., is responding in the time anticipated. In this embodiment, the system does not react to a delay at one node until all the downstream nodes are checked for proper operation.

Process 306 sends a message to the target node (resource manager) to request additional resources be allocated so as to ease the problem.

Note that while the nodes are each shown (e.g., in FIG. 1) with multiple instances of the same application, different applications at a node can also be accommodated, either by sending node response times as a whole to the central gathering point or by grouping the application types and sending response times for each group. Likewise, the control, gathering point can control individual group resources or can control the node resources as a whole. In the later case, the node will have individual group controllers to add resources as needed.

Figure 4:
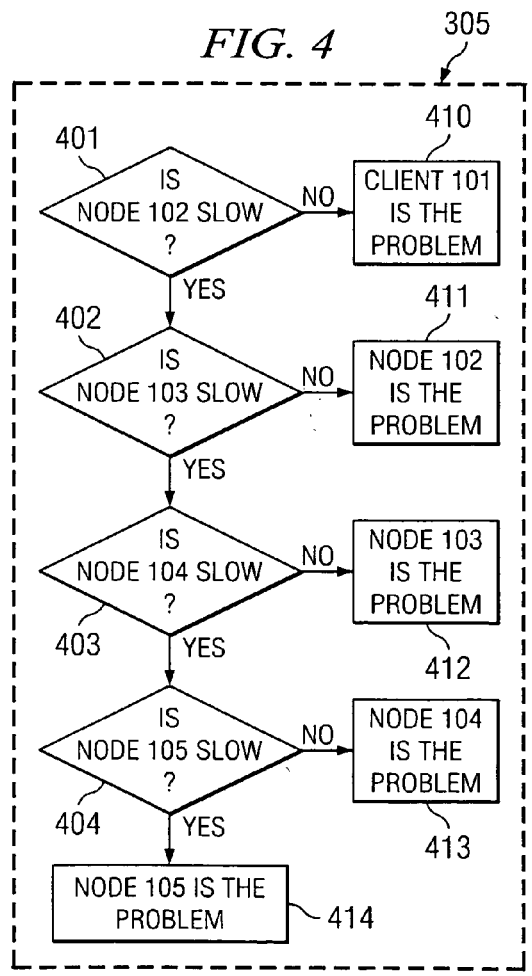
FIG. 4 shows one embodiment of a flow chart for determining which, if any, node is causing a response delay.

FIG. 4 shows a flow chart of one embodiment of a system and method for determining which, if any, node is causing a response delay. Since all nodes are monitored, flow chart determines which node is most likely to be the node in trouble. If a node is "slow", it could be slow because that node is in trouble, or because one (or more) nodes "below" that node in the chain is slow. Thus, if storage 115 is not responding, all nodes (102-104) will also appear slow.

Following the logic of flow chart 40, process 401 determines if node 102 is slower than anticipated. If not, then the problem, if any, is at client node 101 (process 410). If node 102 is slow and node 103 is not (as determined by process 402) then node 102 is the root cause of the problem (process 411). If node 103 is slow and node 104 is not (as determined by process 403) then node 103 is the problem (process 412). If node 104 is slow and node 105 is not (as determined by process 404) then node 104 is the problem (process 413). If node 105 is slow, as determined by process 404, then the problem must be at node 105 (process 414) assuming no further lower nodes. Note that problems could exist at several nodes, but by starting at the end of the chain and working up to the top, the problems are cleared node by node.

The invention claimed is:

1. A method for improving multi-node application processing, said method operable in a system having resources distributed across a network at various network nodes, said method comprising:

measuring application workload response time at each system node; communicating said measured application workload response time from each node to a common point in said system, wherein each node forms a chain of nodes with an end nearest a client node and a top furthest from said client node, wherein said application workload response time at one of said each system node is dependent on every other workload response time on every other of said each system node; and from said common point, optimizing the overall response time and throughput of work processed by said system by adjusting the resources available at each of said measured nodes starting at said end of said chain and working to said top of said chain based on the measured application workload response times.

2. The method of claim 1 wherein said application processing is arranged in tiers at least one node and wherein said resources of at least one node are adjusted between said tiers.

3. The method of claim 1 wherein at least one of said each node is known to be problematic.

4. The method of claim 1 wherein said adjusting comprises: making additional resources available to a node experiencing workload performance degradation.

5. The method of claim 4 wherein said additional resources come from another set of resources at said node.

6. The method of claim 1 wherein the applications available at each of said nodes is of a non-uniform type.

7. A multi-node system comprising:

a plurality of nodes, each node having at least one application, wherein each node forms a chain of nodes with an end nearest a client node and a top furthest from said client node;

means operative at a point common to all of said nodes for determining when the response time of said system is slower than an acceptable response time, wherein said response time of said system comprises an application workload response time at a node of said plurality of nodes is dependent on every other application workload response time at every other node of said plurality of nodes; and means for adjusting the resources at any node determined to be below the acceptable response time by starting at said end of said chain and working to said top of said chain.

8. The multi-node system of claim 7 wherein said adjusting means includes means for determining which node is a bottleneck node; and wherein said adjusting means only adjusts resources at a determined bottleneck node.

9. The multi-node system of claim 8 further comprising:
a common gathering point for receiving from each node a response time of each application running on said node.

10. The multi-node system of claim 9 wherein said applications are arranged in tiers and wherein said application response time is for each tier.

11. The multi-node system of claim 10 wherein said determining means comprises: means for extrapolating response times received from each node.

12. The multi-node system of claim 8 wherein said adjusting means comprises: means at each node for adding resources at said node in response to communication from said determining means.

13. A method for improving multi-node processing in a network; said method comprising:
performing tasks at a plurality of nodes from a plurality of users, each such task requiring resource time for performing said tasks, wherein each node forms a chain of nodes with an end nearest a client node and a top furthest from said client node;
measuring the resource time used to perform said tasks at each of said nodes, wherein said resource time at one of said each node is dependent on every other resource time on every other node of said each node;
adjusting the resource time used at a particular node based upon the results of measured resource times used by said resources at said plurality of said nodes; and
repeating said adjusting where said particular node for each iteration of said adjusting is selected starting at said end of said chain and working to said top of said chain.

14. The method of claim 13 wherein time used by a resource is adjusted by adding resource availability at said node.

15. The method of claim 13 wherein time used by a resource is adjusted by adding resources from another set of applications at said node.

16. The method of claim 13 wherein time used by a resource is adjusted by increasing the operational speed of said task performing resource at said node.

17. The method of claim 13 wherein said particular node is a node determined to be a bottleneck node.

18. The method of claim 13 wherein said adjusting comprises: sending instructions to said particular node from a gathering point common to all nodes.

19. A multi-node processing system comprising:
a plurality of resources running at different nodes, wherein said nodes form a chain of nodes with an end nearest a client node and a top furthest from said client node;
a network interconnecting said nodes;
a resource manager for each of said nodes;
a data gathering point, which monitors response times for each of said nodes, the data gathering point common to said nodes, wherein said response time at one of said nodes is dependent on every other response time on every other node;
a resource controller that controls resources at any node found to be a bottle neck node by, at least in part, using the monitored response times for each of said nodes by adjusting resources available at a selected node of said chain wherein said selected node is iteratively selected starting at said end of said chain and working to said top of said chain,
a communication link between each of said resource managers and said data gathering point; and
the data gathering point using the communication link as a part of monitoring said response times for each of said nodes.

20. The multi-node processing system of claim 19 wherein said resource manager controls the resources assigned to a task at a node in response to data received over said communication link from said data gathering point.

21. The multi-node processing system of claim 19 wherein at least some of said resources that are managed are applications having multiple instances at a particular node.

22. The multi-node processing system of claim 19 wherein said communication link is part of said network interconnecting said nodes.

23. The multi-node processing system of claim 19 wherein said data gathering point is located at one of said nodes.

24. A non-transitory computer usable storage medium having instructions stored thereon that when executed cause a computer system to perform a method for improving multi-node application processing in a system having resources distributed across a network at various network nodes, said stored instructions when executed are operable for:
measuring application workload response time at each system node, wherein said application workload response time at one of said each system node is dependent on every other workload response time on every other of said each system node;
communicating said measured application workload response time for each node where measurements are taken to a common point in said system, wherein each node forms a chain of nodes with an end nearest a client node and a top furthest from said client node; and
application workload response times communicated to said common point for optimizing the overall response time and throughput of work processed by said system by adjusting the resources available at each of said measured node starting at said end of said chain and working to said top of said chain based on the measured application workload response times.

25. The computer usable storage medium of claim 24 wherein said application processing is arranged in tiers at least one node and wherein said resources are adjusted between said tiers at a node.

26. The computer usable storage medium of claim 24 wherein at least one node is known to be problematic.

27. The computer usable storage medium of claim 24 wherein said adjusting comprises: making additional resources available to a node experiencing workload performance degradation.

* * * * *

UNITED STATES PATENT AND TRADEMARK OFFICE
CERTIFICATE OF CORRECTION

| | | |
|---|---|---|
| PATENT NO. | : 7,903,571 B1 | Page 1 of 1 |
| APPLICATION NO. | : 10/887731 | |
| DATED | : March 8, 2011 | |
| INVENTOR(S) | : Daniel Edward Herington | |

It is certified that error appears in the above-identified patent and that said Letters Patent is hereby corrected as shown below:

On the Title Page:
Item (73), Assignee, in column 1, line 1, delete "Develpment" and insert
-- Development --, therefor.

Signed and Sealed this
Fourteenth Day of June, 2011

David J. Kappos
*Director of the United States Patent and Trademark Office*